Sept. 9, 1924.
W. W. ROACH
1,508,068
FRICTION BRAKE
Filed Nov. 1, 1922 4 Sheets-Sheet 1
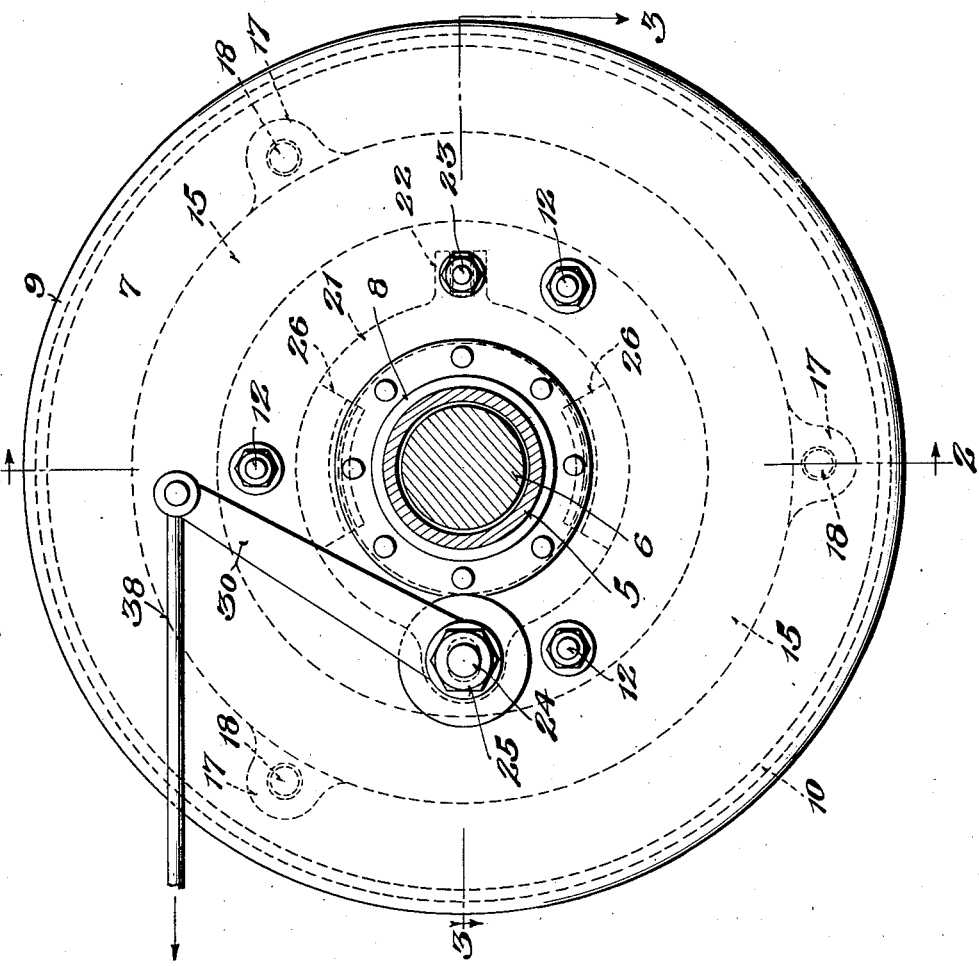
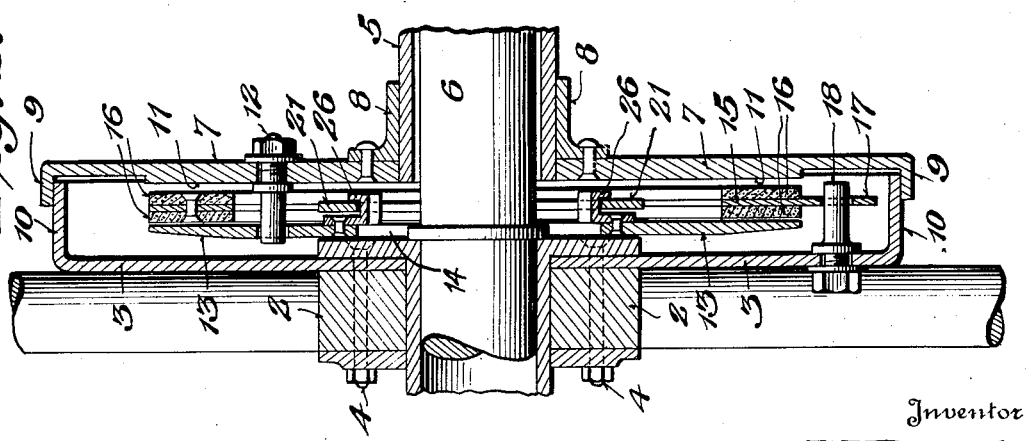
Inventor
*William W. Roach,*
By *Howard A. Coombs*
Attorney

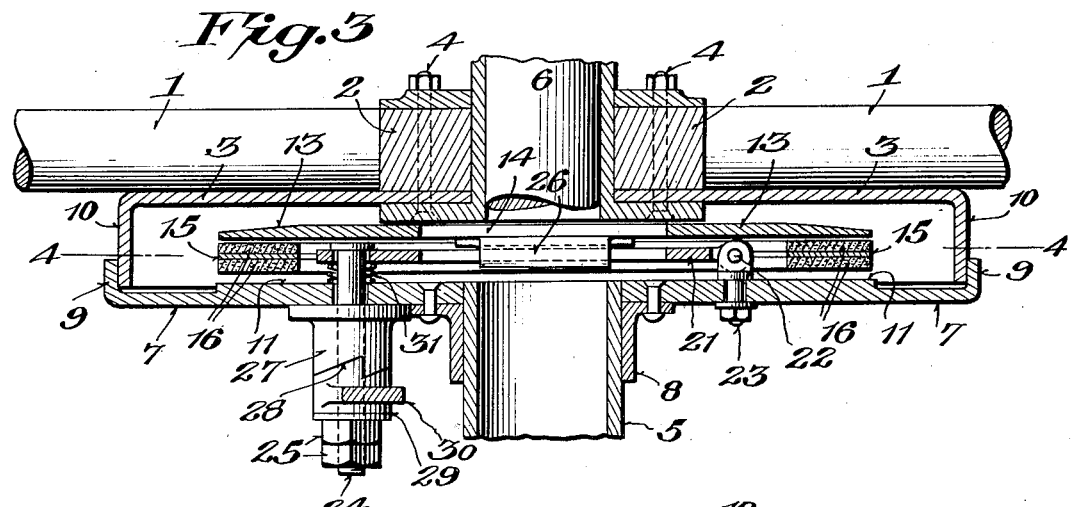
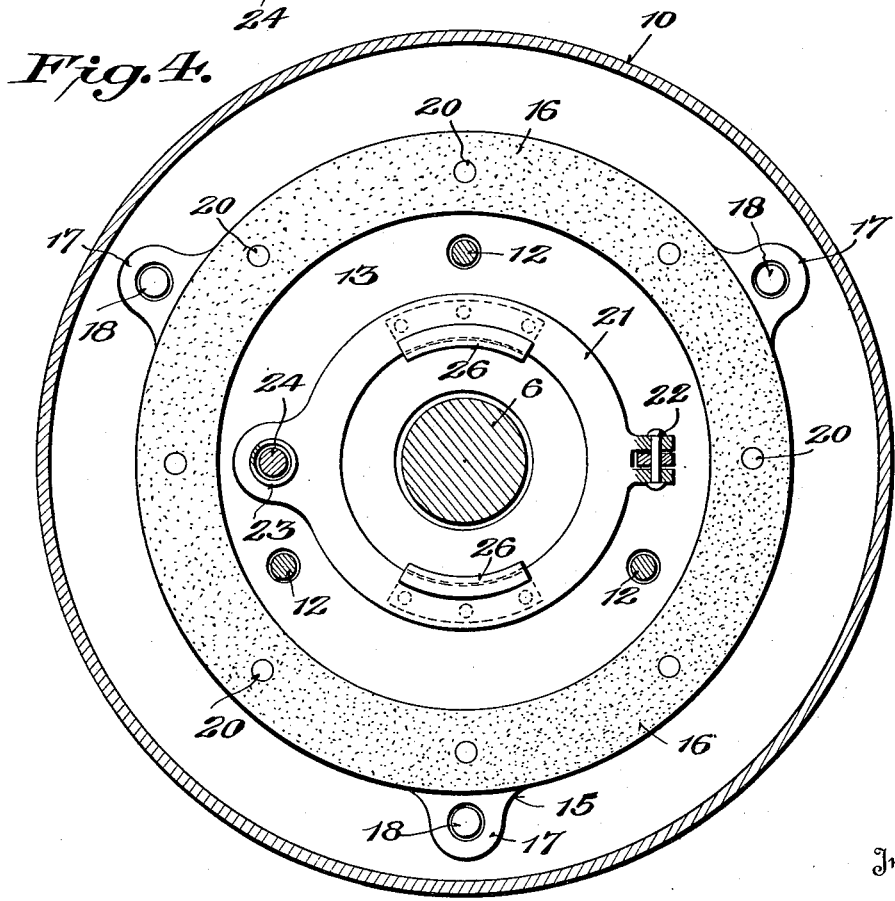

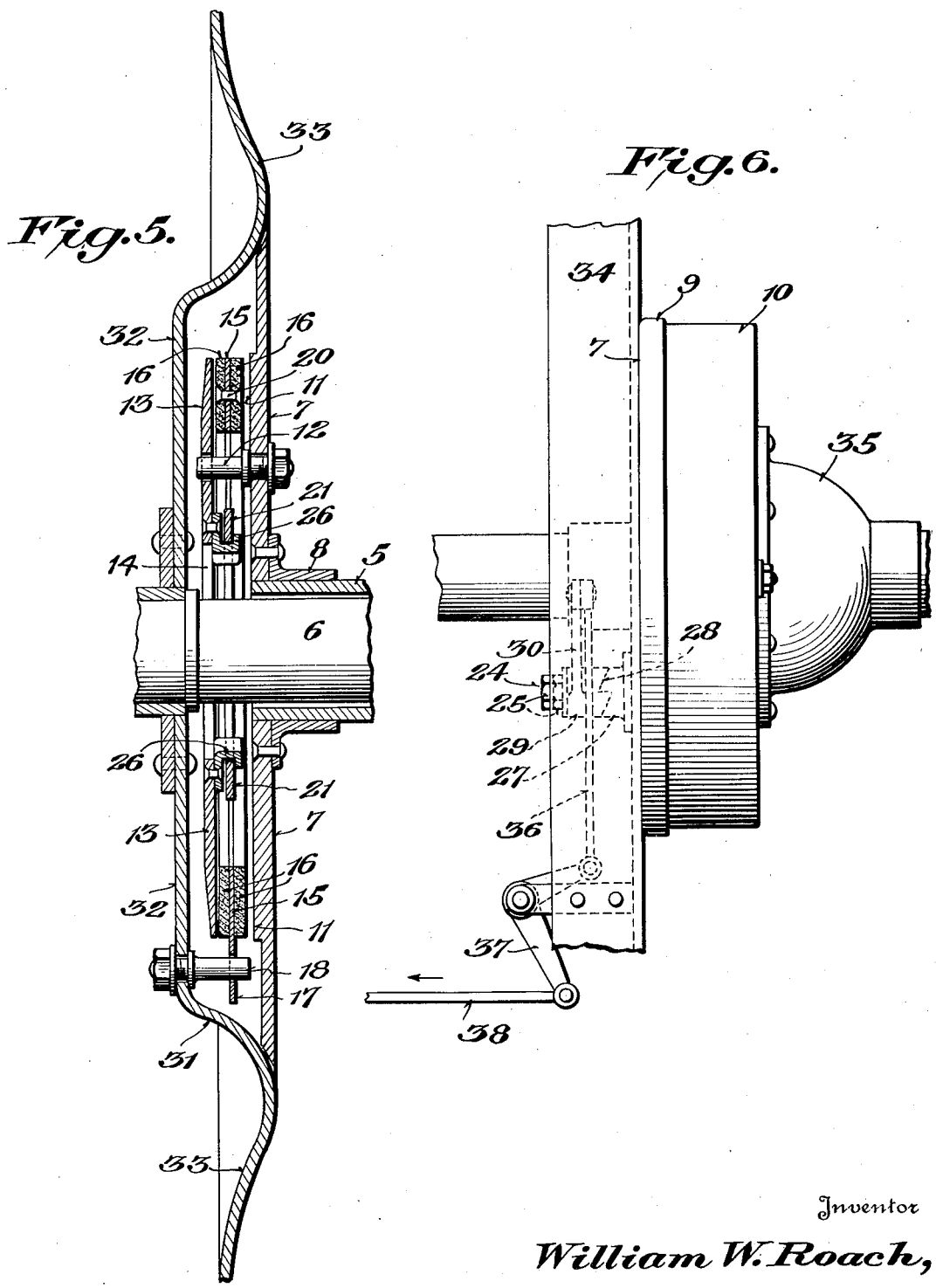

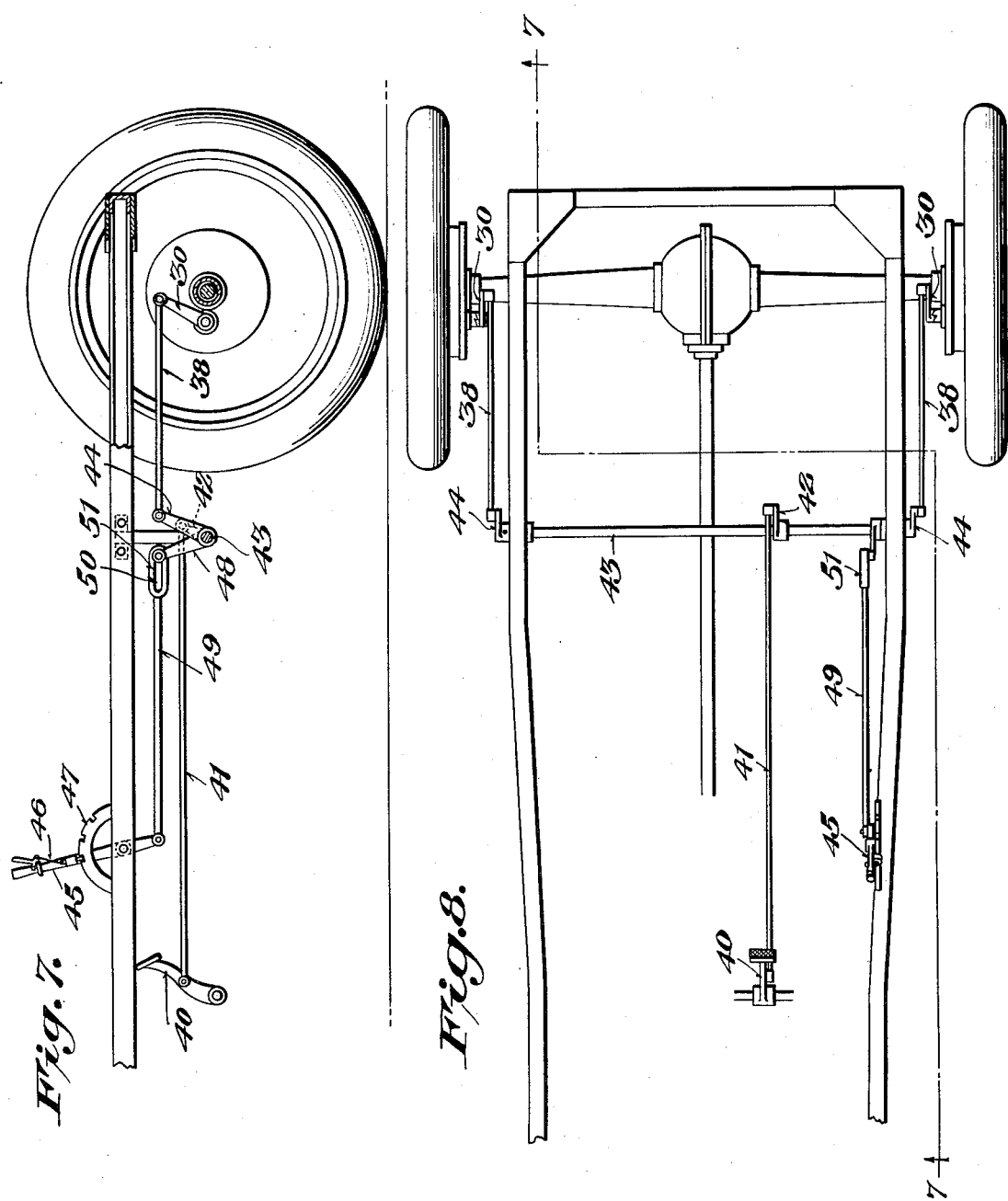

Patented Sept. 9, 1924.

1,508,068

UNITED STATES PATENT OFFICE.

WILLIAM W. ROACH, OF PHILADELPHIA, PENNSYLVANIA.

FRICTION BRAKE.

Application filed November 1, 1922. Serial No. 598,278.

*To all whom it may concern:*

Be it known that I, WILLIAM W. ROACH, a citizen of the United States, residing at Philadelphia, in the county of Philadelphia and State of Pennsylvania, have invented new and useful Improvements in Friction Brakes, of which the following is a specification.

This invention relates to friction brakes of the disk type and is especially adapted and intended for use upon automobiles. It is in the nature of an improvement upon the brakes of my prior Patents No. 1,278,081, of Sept. 3, 1918, and Reissue No. 14,426, of January 22, 1918.

As in the brakes of the said patents, I make use of friction disks instead of bands or shoes, and the brake as a whole is independent of the wheel, or other part to be braked, except for the necessary connections for rotating one portion of the brake with the wheel, so that the brake can operate even if the wheel is off; that is to say, if one wheel is removed, the action of the brake on the other wheel remains the same, which is not the case with the ordinary band or shoe brake.

The improvements will be readily understood from the following description read in connection with the accompanying drawings, in which, Figure 1 is a side elevation of the brake applied to a wheel;

Figure 2 is a section on line 2—2 of Figure 1;

Figure 3 is a section on line 3—3 of Figure 1;

Figure 4 is a section on line 4—4 of Figure 3;

Figure 5 is a section through the brake applied to a disk wheel;

Figure 6 is an elevation of the brake applied to the propeller shaft of an automobile;

Figure 7 is a side elevation of a brake-actuating means, and

Figure 8 is a plan view of the same.

In Figures 1 to 4, an automobile wheel is partially shown at 1, to the hub 2 of which is secured, as by bolts 4, the brake casing member 3. 5 represents the end of the fixed axle and 6 the driving shaft passing therethrough. Secured to said axle, by means of the collar 8, is the plate 7, which constitutes the other, non-rotary part of the casing for the brake and has a flange 9, fitting over the flange 10 of the rotary casing part 3, and, on its inner side, a friction surface 11. The plate 7 carries the studs 12, projecting inwardly into the casing and shown as three in number. These studs pass through holes in the friction disk 13, the center of which is cut away, as indicated at 14. Between the friction surface 11 of the plate 7 and that of the disk 13, is interposed the rotary ring 15, to which rings 16 of friction material, for example asbestos, are secured on each side. Said ring 15 has three external lugs 17, through which pass the studs 18 carried by the casing part 3, so that said friction ring 15, 16, rotates with the wheel, while the plate 7 and disk 13 are held against rotation by their connection to the fixed axle 5. The disk 13 can slide on the studs 12 towards the plate 7, and the ring 15 can slide on the studs 18, so that said ring is gripped between said disk and plate. The asbestos rings 16 may be secured to the ring 15 by means of the rivets 20.

The means I prefer to employ for operating the brake, that is for pulling the disk 13 towards the plate 7, consists of an annular member 21 which is pivoted on the pin 22, carried by the stud 23, secured in the plate 7. The opposite side of said annular member has an opening through which passes loosely the headed stud 24, said stud also passing freely through a hole in the plate 7 and carrying a nut 25 on its outer end. The annular member 21 is operatively connected to the disk 13 by means of two diametrically opposite flanges 26, secured to said member around its central opening and engaging the inner edge of said disk. Secured to the outer side of the plate 7 is a cam sleeve 27, provided with saw teeth 28 on its end and through which the bolt 24 passes, and a conjugate cam sleeve 29, having an operating arm 30, is rotatively carried by said bolt between the nut 25 and the fixed cam sleeve 27. By turning said nut the position of the plate 13 can be adjusted, and consequently the sensitiveness of the brake. A spring 31 is, or may be, interposed between the surface 11 and the annular actuating member 21 to return the parts to inoperative position. By the provision of the intermediate member 21 between the actuating stud 24 and the disk 13, said disk is moved parallel to itself and exerts equal pressure on both sides of its center, which would not be the case if said stud were connected directly to said disk.

In Figure 5 I have shown the casing for the brake as formed in the dished portion 32 of a disk or solid web wheel 33. In this case the plate 7 does not have any flange 9 but is bevelled to fit against said web and thereby close the recess. The brake is otherwise as above described. In Fig. 6 I illustrate the application of the brake to the propeller shaft instead of to the wheel of an automobile. The casing, consisting of the parts 7 and 3, with flanges 9 and 10, has one of its members secured to a stationary part 34 of the chassis, or of the transmission, while the other part is secured to the casing 35 of the universal joint. In this case the arm 30 is connected by a link 36 to a bell crank lever 37 actuated by the brake rod 38, whereas in the case where the brake is applied to the wheel, the brake rod 38 is connected directly to the arm 30, as indicated in Fig. 1.

Inasmuch as my improved brake is much more powerful than the ordinary band brake, it is not necessary to have separate hand and foot brakes, as now generally provided. I provide for the operation of the brake either by hand or foot, however, as shown in Figs. 7 and 8, in which 40 is the foot pedal, connected by rod 41 to the arm 42 on the cross shaft 43, which carries arms 44 connected to the brake arms 30 by the rods 38, and 45 is the hand lever, provided with the usual locking latch 46 and segment 47 and connected to the arm 48 on the shaft 43 by the rod 49, which has a slot 50 in its enlarged end 51, so that the brake can be applied by the pedal without affecting the hand lever 45. The fact that the pedal is depressed when the brake is applied by the hand lever is immaterial. Obviously minor variations in detail from the precise construction shown may be made without affecting the invention.

One of the advantages of this brake is that it is quite independent of the wheel. When a wheel is taken off, the only part removed with it is the casing member 3 and, of course, the studs 18 which connect said member to the ring 15. If the pedal or hand lever is now actuated, the ring is gripped between the plates 13 and 7 and the brake on the other wheel is applied exactly as if both wheels were on. To adjust the brake, it is only necessary to turn the nut 25. By removal of the wheel, the brake is fully exposed for inspection.

Having thus described the invention what is claimed is:

1. A friction brake for automobiles, comprising a fixed plate, a friction ring connected to rotate with the part to be braked, a non-rotary disk on the other side of said ring, said ring and disk being movable axially relatively to said plate, and means to draw said disk towards said plate to grip said ring between them, said means comprising a bolt operatively connected to said disk and passing within said ring and through said plate, a cam sleeve rotatable on said bolt, a conjugate cam sleeve secured to said plate, and means to turn said rotatable sleeve.

2. A friction brake for automobiles, comprising a fixed plate constituting part of a casing for the brake and having a friction surface on its inner side, a friction ring within the casing axially movable into contact with said surface and operatively connected to the rotary part to be braked, a non-rotary friction disk on the other side of said ring axially movable into contact with said ring, a saw tooth cam sleeve secured to the outer side of said plate, a bolt passing through said sleeve and connected to said disk, a conjugate cam member on said bolt, means to turn said member, and means to adjust the effective length of said bolt.

3. In an automobile brake, the combination of a fixed braking disk, an axially movable non-rotary braking disk, a rotary friction ring intermediate said disks, means engaging said movable disk at two diametrically opposite points to force it towards said fixed disk to grip said ring between said disks, and relatively rotatable cam sleeves to actuate said means.

4. A friction brake for automobiles comprising a fixed braking disk, an axially movable non-rotatable braking disk, an intermediate axially movable rotary friction ring, and means to move said movable disk axially so as to grip said ring between said disks, said means comprising an annular member pivoted at one side to said fixed disk, diametrically opposite flanges carried by said movable disk and engaging the inner edge of said member, a bolt loosely secured to the other side of said member and passing within said friction ring and through said fixed disk, a fixed cam sleeve on the outer face of said fixed disk and through which said bolt passes, a rotatable conjugate cam sleeve on said bolt, and means to turn said rotatable sleeve.

5. A friction brake for automobiles comprising a pair of non-rotatable friction disks, an intermediate axially movable rotary friction ring, and means to move one of said disks axially so as to grip said ring between said disks, said means comprising an annular member pivoted at one side to the other disk, diametrically opposite flanges carried by the axially movable disk and engaging the inner edge of said member, a bolt loosely secured to the other side of said member and passing within said friction ring and through said other disk, a fixed cam sleeve on the outer face of said other disk and through which said bolt passes, a rotatable conjugate cam sleeve on said bolt, means to turn said rotatable sleeve, a nut on said bolt to adjust the axial position of said movable disk, and a spring to return said movable disk to non-braking position.

6. A friction brake for solid web wheels, comprising a plate carried by the fixed axle in position to close a dished recess in the web of the wheel, and having a friction surface on its inner side, a friction disk within said recess, studs carried by said plate and passing through holes in said disk, means on the outer side of said plate and connected to said disk to slide the latter on said studs, and a friction ring, movable axially but connected to rotate with the wheel, intermediate said disk and plate.

7. An automobile brake, comprising a casing member secured to the wheel and carrying inwardly projecting studs, a complementary casing member secured to the fixed axle and also carrying inwardly projecting studs, an annular friction disk slidably mounted on said last mentioned studs, an intermediate friction ring slidably mounted on said first mentioned studs, and means on the outside of said complementary casing member to draw said friction disk towards the same to grip said friction ring between them.

In testimony whereof I have hereunto set my hand.

WILLIAM W. ROACH.